(12) United States Patent
Engdahl

(10) Patent No.: US 6,282,455 B1
(45) Date of Patent: Aug. 28, 2001

(54) WALK-THROUGH HUMAN/MACHINE INTERFACE FOR INDUSTRIAL CONTROL

(75) Inventor: Jonathan R. Engdahl, Chardon, OH (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/175,009

(22) Filed: Oct. 19, 1998

(51) Int. Cl.[7] .................................................. G05B 15/00
(52) U.S. Cl. ................................. 700/83; 700/96; 434/72
(58) Field of Search .............................. 700/97, 96, 95, 700/83, 2, 1, 108, 169; 434/72

(56) References Cited

U.S. PATENT DOCUMENTS

| | | | |
|---|---|---|---|
| 4,451,895 | * | 5/1984 | Silwkowski ........................... 345/326 |
| 4,570,217 | * | 2/1986 | Allen et al. .............................. 700/83 |
| 5,121,319 | * | 6/1992 | Fath et al. ................................ 700/83 |
| 5,134,560 | * | 7/1992 | Ferriter et al. ........................... 700/83 |
| 5,355,317 | * | 10/1994 | Talbott et al. .......................... 700/97 |
| 5,396,265 | * | 3/1995 | Ulrich et al. ............................ 345/158 |
| 5,526,478 | * | 6/1996 | Russell, Jr. et al. .................. 707/512 |
| 5,576,946 | * | 11/1996 | Bender et al. ........................... 700/17 |
| 5,838,588 | * | 11/1998 | Santoso et al. ....................... 700/287 |
| 5,956,665 | * | 9/1999 | Martinez et al. ..................... 702/188 |

\* cited by examiner

*Primary Examiner*—William Grant
*Assistant Examiner*—Edward F Gain, Jr.
(74) *Attorney, Agent, or Firm*—Keith M. Baxter; Alexander M. Gerasimow; William R. Walbrun

(57) ABSTRACT

A human/machine interface for designing, monitoring and troubleshooting complex industrial control systems uses the paradigm of the factory floor to organize machines, control program portions and data as virtual spatially linked objects that may be moved in three dimensions to be joined with other spatially linked objects. The user may move within the virtual factory floor among the spatially linked objects followed by spatially indifferent objects which provide tools for monitoring and interacting with the spatially linked objects. Proximity of visual objects determines data sharing between objects.

10 Claims, 5 Drawing Sheets

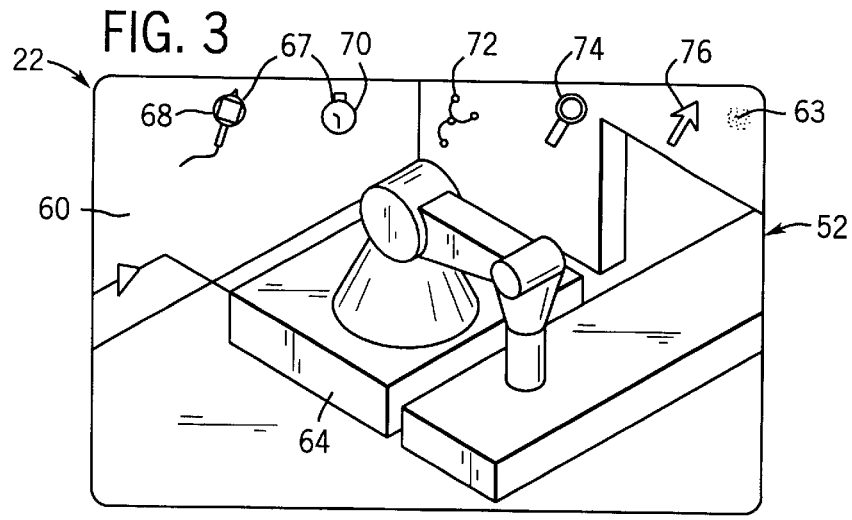
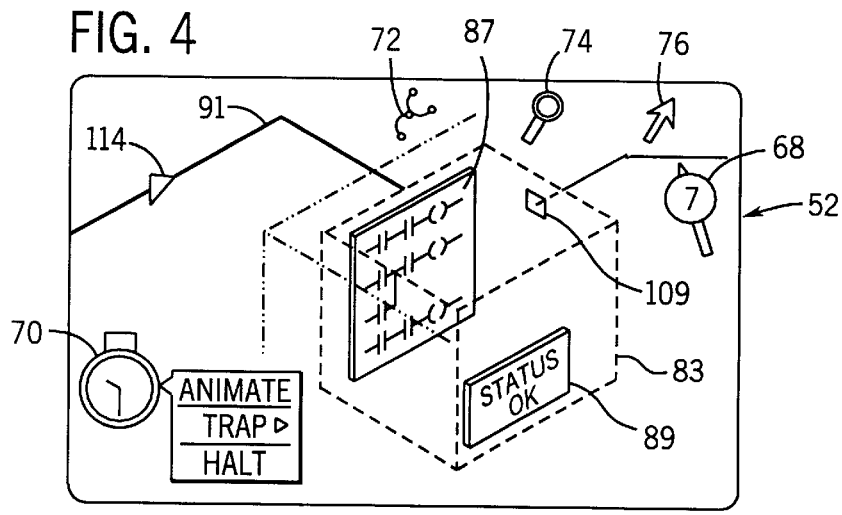
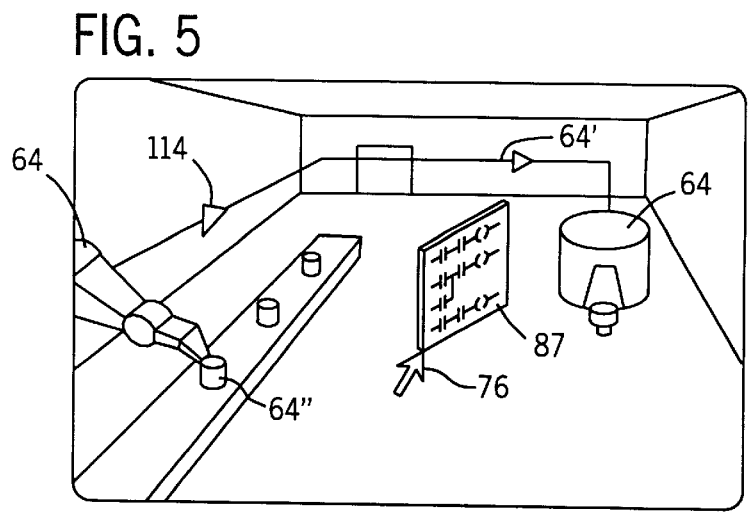

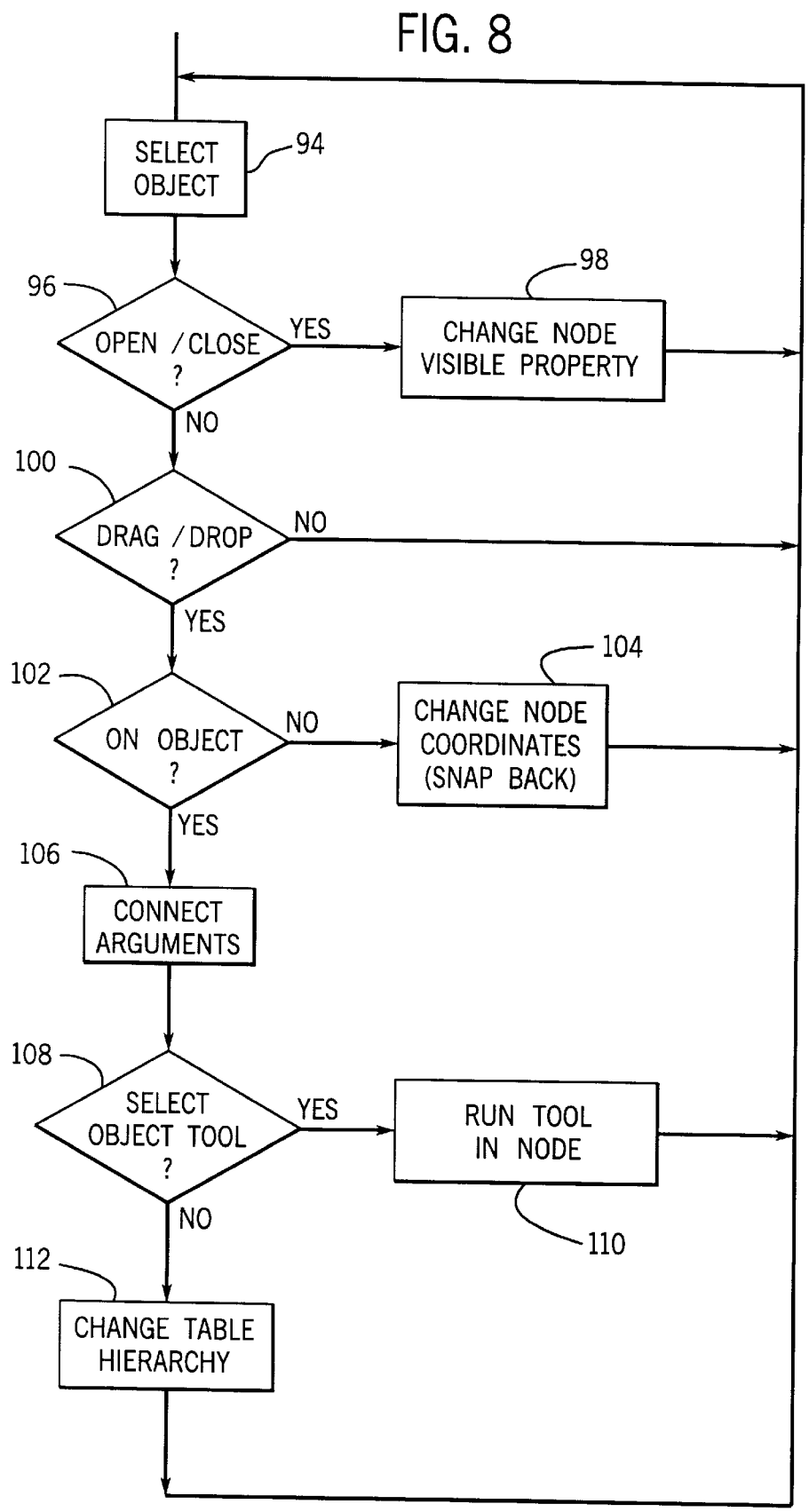

WALK-THROUGH HUMAN/MACHINE INTERFACE FOR INDUSTRIAL CONTROL

BACKGROUND OF THE INVENTION

The present invention relates to industrial control systems and, in particular, to a human/machine interface for the programming and monitoring of control programs used for the control of factories and the like.

Industrial controllers such as those described in U.S. Pat. Nos. 3,810,118; 3,942,158; 4,165,534; and 4,442,504 are high-speed computers that may be connected to industrial equipment, such as automated assembly lines or machine tools, to operate such equipment in accordance with a stored control program. The stored program includes instructions, which when executed, examine the condition of selected inputs to the controller from sensing devices on the controlled equipment, and energize or de-energize selected actuators or outputs from the controller to operate devices on the controlled equipment.

Inputs to the industrial controller may be discrete binary signals, such as those from switches, which may detect limits of process variables such as motion, temperature, time, or other quantities, or the inputs may be analog measures of process variables which are generally then converted to digital words for processing, or the inputs may be multi-variable information.

Similarly, the outputs of the industrial controller may be either discrete binary signals as produced, typically, by mechanical or solid state relays; analog outputs produced by means of a digital to analog converter; or multi-variable commands. Some of the inputs and outputs to the centralized controller may be remotely located and connected to the controller by means of a digital communications link. Typically, the network connects the controller with a remote I/O rack at which a number of inputs and outputs are clustered.

Current programming tools may display a view of the instructions of the control program as graphical elements (such as relay coils and contacts or function blocks) to make the control program easier to understand. Certain instructions may include captions indicating the state of their data or a view of the data may be displayed in table form. Animated two-dimensional representations of machines, including for example, pumps or motors or reaction vessels, have been used to provide a view of certain process variables such as "on" or "off" states or liquid level or temperature.

Present generations of industrial controllers may be extremely complex with thousands of control points distributed over a factory having dozens of machines coordinated through the operation of the control program. Unlike conventional computer programs of equal complexity, the operation of the control program is highly dependent on intervening real-time physical processes (the operation of the machines of the factory). While the state of this controlled equipment is largely defined by its input and output data, viewing and understanding this data in the context of the control program is difficult. Further, each of the controlled machines normally includes some processing capability so the data to the machine may not directly represent its state. To the extent that the control program is divided among a central processor and machines themselves, gaining a complete understanding of the control process as is necessary for design and monitoring of the control process is difficult.

Current limitations in representing large control programs and its associated data creates an effective limit to the complexity of control systems even as larger control structures coordinating the operations of larger systems are demanded. What is needed is a way to integrate views of large and possibly distributed control programs, their associated control data and the actual physical processes in a logical and intuitive manner.

SUMMARY OF THE INVENTION

The present invention creates an intuitive multi-viewed representation of a control system using the paradigm of the factory floor. Software "objects" are created representing the machines, their status, their programming, and their data each having a defined visual representation and three-dimensional spatial coordinate. In this way, relevant portions of the control program and data may be associated with a particular machine using the mnemonic of physical location.

These spatial "objects" may also serve as "containers" allowing certain objects to be placed within other objects in nested configuration providing yet another dimension of organization.

Specifically, the present invention provides a human/machine interface for use with an industrial control system including at least one electronic computer controlling the operation of an industrial process through the use of a stored program. The stored program receives data from the industrial process in the form of control inputs and provides data to the industrial process in the form of control outputs. The industrial process includes a plurality of machines operating in a factory and the industrial control system communicates with the machines over a network. The invention includes a visual display and a multi-dimensional input device (such as a mouse) communicating with a computer on the network. The computer executes an interface program to provide a three-dimensional representation of a virtual factory with images of the machines dispersed in three-dimensions within the virtual factory and images of portions of the control program associated with the control of the given machine linked to the image of the given machine. The program responds to inputs from the multi-dimensional input device to change the viewpoint allowing the user viewing the visual display and operating the multi-dimensional input device to obtain the perception of moving through the virtual factory.

Thus, it is one object of the invention to provide an intuitive framework for organizing and displaying the data and program of an industrial control system. The framework of spatially defined objects dispersed in three-dimensions is easily understood by human operators.

The images displayed may include an image of the data and the computer may further execute the interface program to animate the images in response to signals on the electrical network to depict operation of the industrial process. The type of animation may include the state of operation of a machine represented by the image, the values of data used by the machine represented by the image, a point of execution in the portion of the control program represented by the image; or a flow of data between machines.

It is thus another object of the invention to integrate a view of control data and machine state into the interface of the present invention as physical objects.

The interface program executed on the computer may link images by placing images of program portions, data or machine state visually within the images of the machines.

Thus, it is yet another object of the invention to allow for a visual parsing of an extremely complex control program among controlled devices. Collecting objects to be contained within its machine simplifies the overwhelming complexity of large industrial control programs.

The interface program executed on the computer may respond to input from the multidimensional input device to allow the user to select images and a selected image may be moved by further input from the multidimensional input device to change the linking between images of portions of the control program and images of machines.

It is another object of the invention to provide a powerful human/machine interface making use of the paradigm of object oriented programming. By representing software objects as tangible three-dimensional objects that may be moved around a virtual factory, use and reuse of software objects under the paradigm of object oriented programming is made immediate and clearer.

The foregoing and other objects and advantages of the invention will appear from the following description. In the description, reference is made to the accompanying drawings which form a part hereof and in which there is shown by way of illustration, a preferred embodiment of the invention. Such embodiments do not necessarily represent the full scope of the invention as claimed.

BRIEF DESCRIPTION OF THE DRAWINGS

FIG. 3 is a three-dimensional representation of a virtual factory corresponding to the factory of FIG. 1 showing spatially linked and spatially independent objects;

FIG. 4 is a figure similar to that of FIG. 3 showing use of two of the spatially independent objects providing tool functions and showing spatially linked objects within other spatially linked objects, the later rendered transparent;

FIG. 5 is a figure similar to that of FIG. 4 showing use of the spatially independent cursor object to move a spatially linked program code object between machines;

FIG. 8 is a flow chart showing the operation of the node editor in modifying the nodes of the scene graph of FIG. 6.

DETAILED DESCRIPTION OF THE PREFERRED EMBODIMENT

Figure 1:
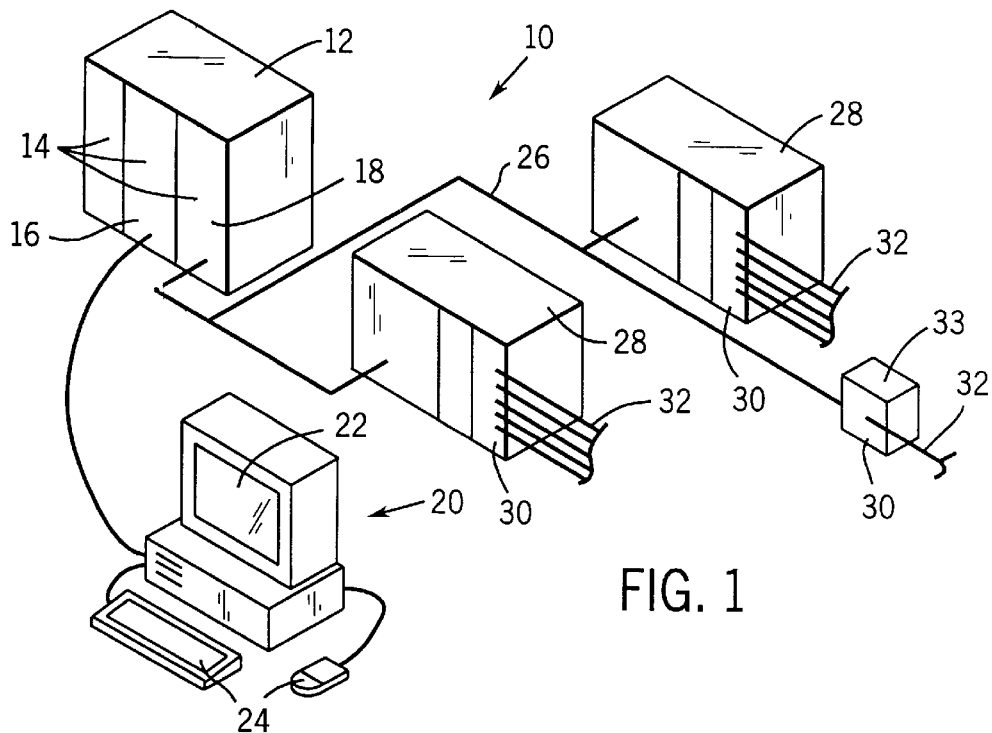
FIG. 1 is a simplified perspective view of a control system useful for controlling and coordinating machines within a factory.

Referring now to FIG. 1, an industrial control system 10 includes a central control unit 12 typically providing a housing with a common back plane into which one or more modules 14 may be inserted including a central processing unit 16 and a communications adapter 18.

The central processing unit 16 is connected to a terminal 20 providing a visual display 22 and one or more user input devices 24. The display may be a cathode ray tube or other flat panel type display, a head mounted display, such as goggles or glasses employing a small liquid crystal or cathode ray tube elements for each eye to provide stereo optic effects, or a virtual retinal display in which an image is projected directly on to the retina of the eyes. Alternatively, the display may be a so-called 'cave' in which multiple electronic projection screens form an enclosed virtual environment. The cave may be used with shutter glasses or the equivalent to provide a three dimensional effect. Such display types are well known in the art.

The input device 24 may be a conventional keyboard and mouse, or a spaceball (as shown) the latter providing a sphere with sensors allowing six degrees of input, or other similar devices such as a space-mouse, 'wand', haptic or data-glove as are known in the art. The input device may further be a 'haptic' device, providing force feedback as well as input, or a voice input system or eye motion input system (gaze tracker), all well known in the art for providing for multi-dimensional input for a human operator.

The central processing unit 16 communicates with the communications adapter 18 which is connected to a common network 26 which in turn connects with one or more remote units 28. In a conventional control system, remote units 28 provide input output functions only, however, they may also provide separate computing capability to execute portions of a control program also executed by the central processing unit 16.

Each remote unit 28 includes an I/O interface 30 having lines 32 exchanging input and output signals with controlled equipment (not shown in FIG. 1). The I/O interface 30 may be essentially free-standing as a highly distributed control node 33 also connected to network 26.

Figure 7:
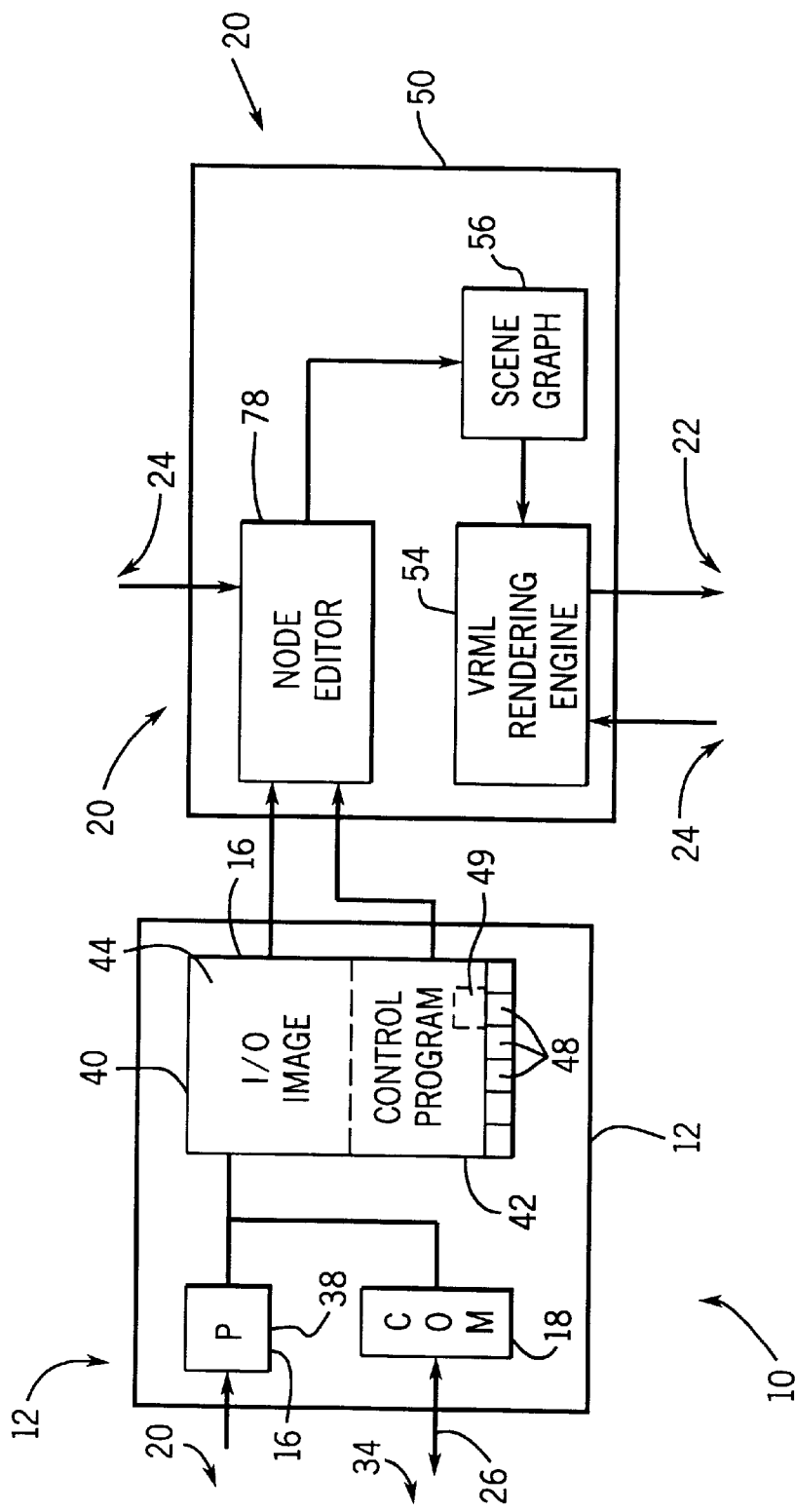
FIG. 7 is a blocked diagram of the various portions of the operating system of the present mention including a VRML rendering engine for rendering the scene graph of FIG. 6 and a node editor for modifying the nodes of the scene graph of FIG. 6.

Referring now also to FIG. 7, the central processing unit 16 in the central control unit 12 includes a processor 38 communicating with a memory 40 to execute the control program 42 contained therein. In the case where program portions 48 of the control program 42 are contained in the remote units 28 (or in the controlled machines themselves) copies of those program portions 48 may also be contained in memory 40 for reference. Typically, also the control program 42 as executed by the processor 38 will have portions 49 uniquely associated with particular machines 34 insofar as the portion 49 produce outputs relevant to that machine 34 or is responsive to inputs from the machine 34.

During operation of the control system 10, input and output data is received through the communications adapter 18 and stored in an I/O image table 44 contained in the central processing unit 16 and accessible by the processor 38. The communications adapter asynchronously updates the I/O image table 44 to contain current values of the input data. The processor 38, then executes the control program 42 to read inputs from the I/O image table 44 and based on the logic of the control program 42, write new outputs to the I/O image table 44. These outputs are then asynchronously transmitted to the controlled machines 34 by the communications adapter 18.

Figure 2:
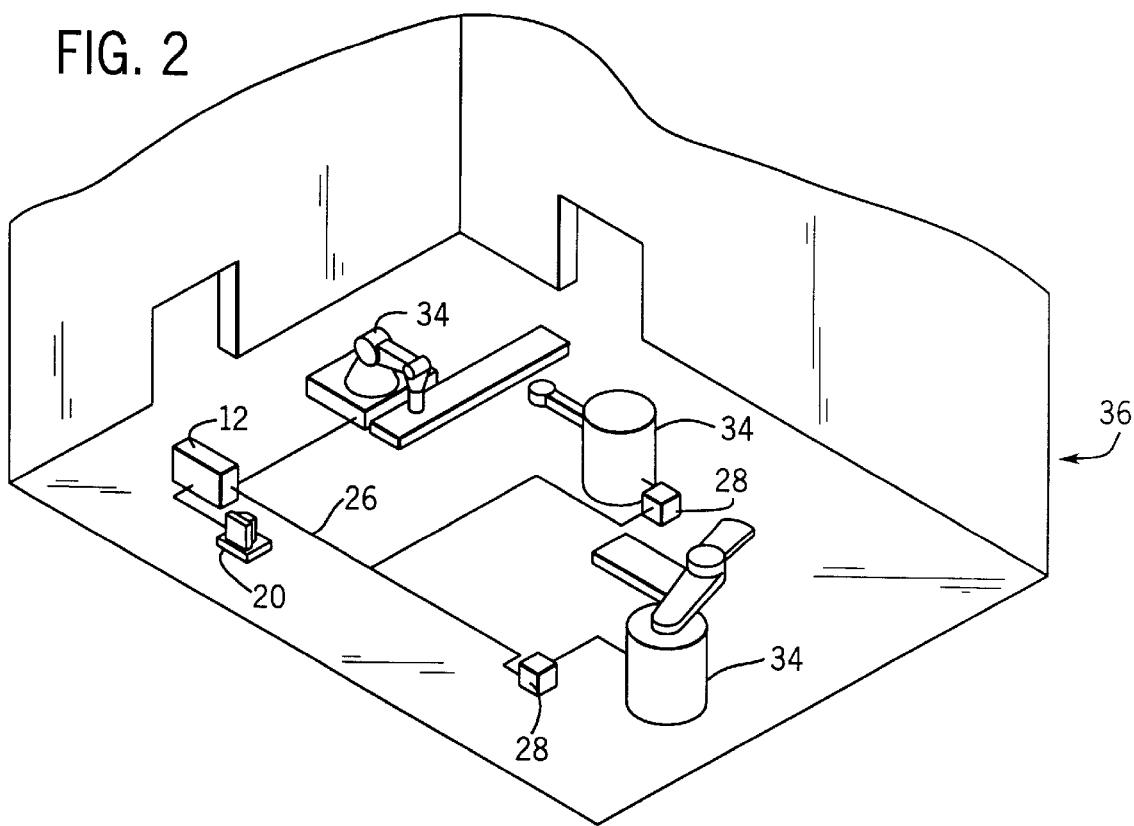
FIG. 2 is a fragmentary perspective view of a factory showing the control system of FIG. 1 and its associated machinery as located within the factory.

Referring now to FIG. 2, the controlled machines 34 connected to I/O interface 30 of FIG. 1 may be located about a factory environment 36, interconnected by network 26. The factory environment 36 presents a volume in which each machine 34 has a defined three-dimensional coordinate location. The locations are generally determined by the physical processes executed by the machines and their interaction in executing those processes.

Referring now to FIGS. 2, 3 and 7, the present invention uses the factory environment to provide a three-dimensional paradigm for presenting information about the control system 10 useful for design, programming, control and maintenance of factory processes. This is accomplished by a human/machine interface provided by an "application oriented" operating system 50 as may be run in the processor of the terminal 20.

A principal feature of the applications oriented operating system 50 is that it provides a three-dimensional virtual environment 52 representing the factory environment 36, through which a human operator may move. This is accomplished by means of a VRML rendering engine 54 capable of reading a scene graph 56 and producing three-dimensional representations of the factory environment 36 and the machines 34, and displaying the same on the display 22 from different viewpoints determined by signals received from the input device 24. One commercially available VRML rendering engine 54 suitable for use with the present invention, is the (3D Studio Max by Kinetix) Cosmo Player by Silicon Graphics. .

Figure 6:
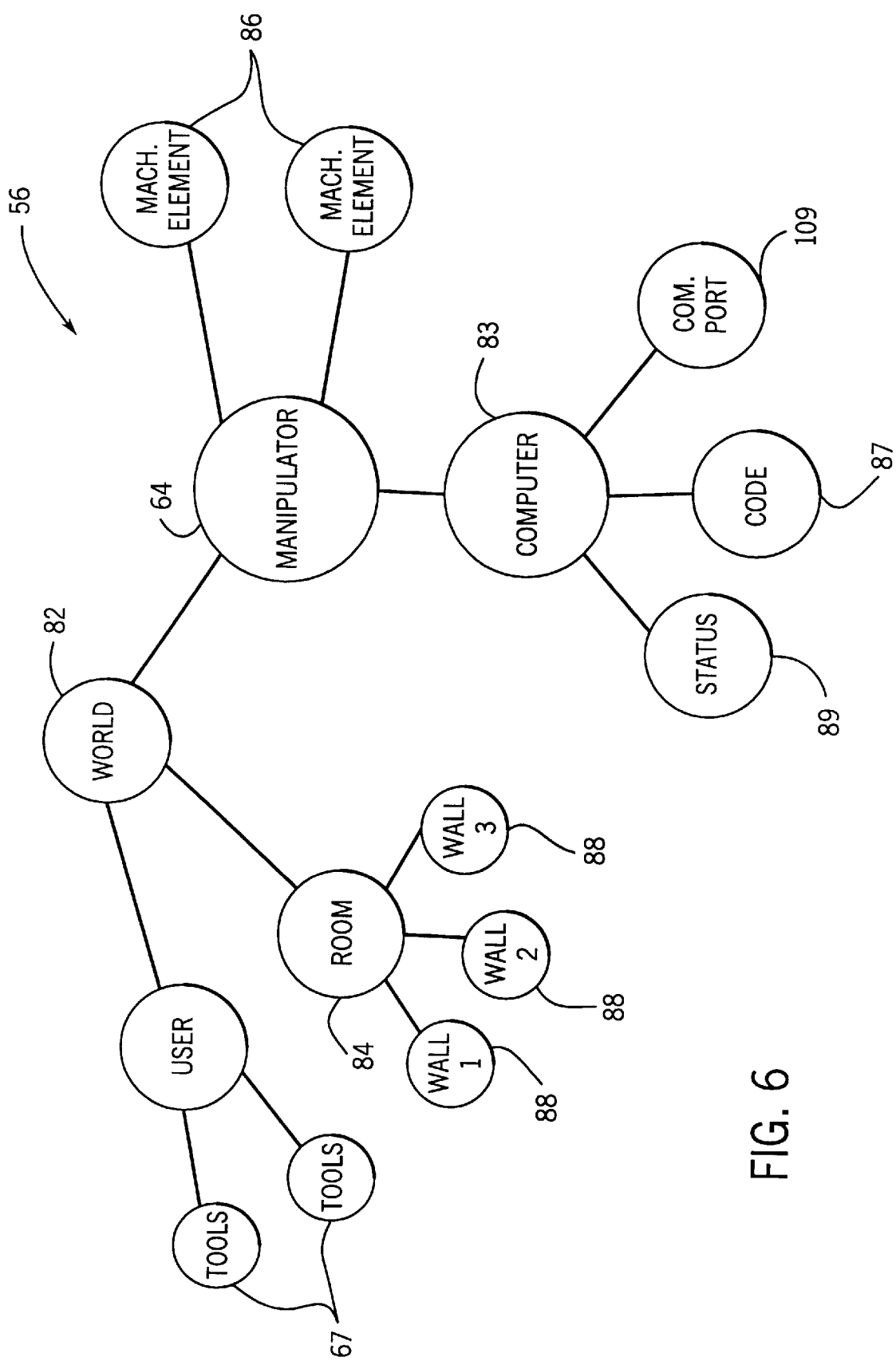
FIG. 6 is a graphic representation of a scene graph employed by the present invention to track the hierarchy and association of different spatially linked objects the latter represented by nodes.

Referring to FIGS. 3, 6 and 7, prior to the three-dimensional rendering of the virtual environment 52, the factory and its machines must be is described by a scene graph 56 (shown in FIG. 6) and presenting a mathematical description of the walls 60, floors and doorways of the factory represented in the virtual environment 52. The scene graph 56 preferably follows the VRML (virtual reality markup language) well known in the art in which scene elements are arranged as nodes on a tree structure. The graph structure is implemented by a corresponding data structure stored in memory as ASCII text with each node being a record and indicating other records that are its children and holding data describing the node, termed "properties".

An advantage of the VRML scene graph implementation is that each nodes spatial coordinates are defined relative to its parent node and hence children nodes "move" with the parent node when the coordinates of the parent node are changed. Generally the coordinates include x, y and z Cartesian coordinates as well as rotative coordinates of roll, yaw, and pitch. This allows visual objects, represented by children nodes, to be placed "withthin" other visual objects represented by parent nodes.

The scene graph 56 links to a root or "world" node 82 a number of wall nodes 83 collected by a group node 84 labeled "room". Each node, as well as having a place in the hierarchy of the scene graph 56 and relative coordinates, as described above, has a number of properties including generally a shape and texture and can perform certain "methods" as will be described. In the present invention the textures 63 may be conventional building materials or may be fanciful textures such as the sky or the like. Multiple rooms of arbitrary complexity may be created by adding new nodes 84 and 83.

The virtual environment represented by nodes 84 and 83 may serve as an organizational structure for the large amount of information relevant to the control system 10 represented as objects 64. Each object 64 is represented by one node in the scene graph 56, for example, a manipulator on the factory floor may be represented by a node 64. Henceforth the same number will be used to designate the object and the node.

The node 64 for the manipulator provides a three dimensional depiction of the manipulator through a number of children "machine element" nodes 86 having shape and texture properties (and possibly composed of other children nodes not shown) to depict the superficial aspects of the machine 34. The depiction of the manipulator may be animated using conventional VRML techniques responsive to variables provided by the node editor as will be described.

The nodes of the present invention provide more than visual representations of the objects but also include an extensive list of properties that reflect the data associated with the represented object, for example, its input and output data and the portions of the control program relevant to the object. The nodes also provide "methods" or software routines allowing them to process data represented by properties of their own or other nodes (particularly parent nodes). The interconnections of the scene graph also provide paths of data flow between methods of the nodes.

Referring still to FIG. 6, and as mentioned above, the organization of the scene graph 56 allows nodes for particular objects 64 to be associated with other nodes of object 62 (both with respect to space and data connections) for intuitive organization of the great amount of data represented by the factory automation system. Thus, the manipulator node 64 may have a dependent computer node 83 having its own properties and providing (through other nodes not shown) a similar depiction of a component computer, which according to the hierarchy of the scene is contained in the manipulator 64. As well as being placed in the manipulator physically, the computer node connects to the properties of the manipulator node so as to, for example, animate itself according to the manipulator properties, through its internal methods. Similarly, the manipulator node may respond to the operation of the computer node, again through a linking of properties.

The computer node 88 in turn holds nodes for a status object 89, a code node 87, and a communications port object 109, each of which provides a visual representation of the associated object, even though, in this case, some of the objects have no physical presence. The code node 87, for example, provides a representation of the portion 49 of the control program 42 related to the manipulator object of node 64, a status node 89 being a state representation indicating the status of the manipulator 64 and having no physical counterpart, and a communications port node 109 providing a window to data communicated over the network 26 to the manipulator 64.

Generally each node includes the property of visibility and thus its associated object may become invisible or transparent allowing this nesting of objects in other objects to be properly displayed on the visual display 22 and the display to be simplified when all components to nodes need not be displayed.

Referring again to FIG. 7, generally, the VRML rendering engine 54 accepts inputs from the terminal 20 from the multi-dimensional input devices 24, defining the coordinates of the user, to allow viewing of the objects 64 via their images in the scene graph 56 as will be described. Other inputs from the user are used to manipulate the scene graph 56 in more fundamental ways including moving objects and changing their properties.

Most VRML rendering engine 54 allow for the depiction not only of spatially linked objects 64, fixed with respect to the coordinates of the virtual environment 52, but also of spatially independent objects 67 that move with the human operator as the operator moves through the virtual environment 52. This is done by establishing a user node 88 whose coordinate properties mirror the user's coordinates in the virtual factory. The user node 88 serves as a parent node for objects 67 that follow the user around. In the present invention, these objects 67 are used to represent tools that can be accessed by the user as the user is at any location within the three-dimensional virtual environment 52.

In the preferred embodiment, five tools are provided. The first is a meter tool 68 for reading qualitative data from objects 64 whose physical counterparts have physically measurable parameters associated with the quantifiable data. A watch tool 70 is used for measuring real-time occurrences in the factory environment as reflected in its virtual depiction or for modifying the relationship between virtual time and real time in instances where troubleshooting and simulation of the factory may be desired. A stethoscope tool 72 is used to permit the user to "observe" qualitatively physical aspects of the machinery represented by the object 64, such as sound or vibration. A magnifying glass tool 74 allows enlargement of the three-dimensional virtual environment 52 allowing yet a fourth effective dimension of movement. Finally a cursor 76 allows interaction between the user and the object 64 either to select, move, copy or otherwise rearrange those objects 64.

Referring still to FIG. 7, the present invention augments what would otherwise be a passive representation of the factory by means of a node editor 78 which passes external data to the nodes which may respond, through their methods, to such data by animation or the like in coordination with input output data from the I/O image table 44 the latter which reflects the state of the objects 64. The state may be a physical movement of the object 64 in the case of a machine 34 or when the object represents an intangible aspect of the control process a visual representation of the state of that object. For example, when the object 64 is a program portion 48 or 49 of the control program 42, a visual representation of the executing instruction may be provided.

The node editor 78 also operates directly on the scene graph 56 to perform normal editing functions such as cutting, copying and pasting. In this way objects 64 may be readily duplicated and reused as is well-known in the art. The node editor 78 also allows the generation of new nodes either by entering the required ASCII text or through the use of higher level tools well known in the art. Importantly the node editor 78 allows the location of the objects represented by the nodes to be moved about the virtual factory by changing their coordinate properties.

Referring now to FIG. 4, the visibility of a particular object 64 may be changed through the node editor 78 receiving cursor commands from the devices 24 specifically by the user manipulating the cursor 76 to be superimposed over the image of the object 64 within the three-dimensional virtual environment 52 and to toggle the visibility property in the node of that selected object 64 using a predetermined keystroke on the input devices 24. In the example of FIGS. 6 and 4, the manipulator object 83 has been made transparent revealing the status object 89 and the program portion object 87. The coordinates of the cursor are compared to the absolute coordinates of the nodes to identify the relevant node in the scene graph.

Referring to FIG. 8, the above described selection process is performed by the node editor 78 from commands from the terminal 20 as indicated by process block 94. The keystroke command indicating that the object should be opened to reveal interior objects or closed in the reverse case is indicated by decision block 96. The changing of the visibility property of scene graph 56 is indicated by process block 98.

Using this procedure, complex interrelationships between the physical, software and state elements of a control system 10 may be logically illustrated and the information organized in an intuitive manner.

Referring to FIGS. 4, 6 and 8, the cursor 76 may also be used to perform a dragdrop operation familiar to those using mouse based programs but in three-dimensions. In such an operation, the cursor 76 is placed over the image of an object 64 and a predetermined capture key on the input device 24 is pressed and retained in a pressed state until the cursor 76 is moved to a new location within the virtual environment 52 carrying the selected object 64. A drag-drop operation is indicated by decision block 100 of FIG. 8. The capture key like all predetermined key commands, need not be a button pressing but may be a verbal command or the like, or in the case of the use of a data glove, a particular grasping motion of the fingers of the hand.

If the drag drop operation culminates with the selected object 64 being placed on a portion of the factory where there is no other object 64 as determined at decision block 102, then the object's node coordinates 90 in FIG. 6 are changed if the object is a stationary object 64. If the object is a spatially indifferent object 67, (e.g., a tool) the tool snaps back to its location at the top of the display of the three-dimensional virtual environment 52. These outcomes are indicated by process block 104. Generally, movement of an object 64 which contains other objects 64 moves all of the contained objects 64 as well provided the container object 64 is visible. Invisible objects 64 are generally not moveable until they are made visible. The container relationship and the visibility of objects is determined from scene graph 56.

At process block 106, if the culmination of the drag-drop operation is that the selected object 64 is on top of another object 64, then the objects 64 of the child node takes its arguments from the parent node's properties and, if necessary, the parent node connects to the child node's properties. For example, the meter tool 68 has an input argument accepting a physical quantity output type that may be a physical quantity reflected in data of a property associated with another object 64. Placement of the meter tool 68 on a particular stationary object 64 provides a reading of physical quantity I/O data in quantitative form that is part of the properties of the node of the stationary object 64. An example stationary object would be a terminal block object 109 providing a visual terminal for electrical values and having a voltage property. As a second example, the communications port object 91 may have communications data as a property readable by the meter tool 68. The identification of objects that should have their arguments connected is by parent child relationships of the scene graph 56. All properties of the nodes, representing data associated with the nodes, may be grouped according to data type so that such linkages may be established automatically. Thus the meter tool methods indicate the type of data they may accept (e.g., voltage, temperature, logic) and when connected to another node as a child may search for relevant data types and automatically connect to these devices by reading the properties associated with the data types.

The stethoscope tool 72 operates in a similar manner but providing qualitative readings of I/O data such as may be deduced from one or more property types according to general rules. For example, the stethoscope tool 72 may deduce machine operating temperature from measuring a property recording a duty cycle of the machine motor and display the output as temperature or may output a machine sound indicating operation of the machine deduced from sensors indicating machine component motion accessible as yet another property of the node for that component.

Alternatively, when the selected object was not a tool but was a stationary object 64, the properties connected are common inputs and outputs according to the context of the connection. Thus, the program portion object 87 if moved into the computer object 83 of another manipulator object 83 adopts the arguments of the second manipulator object 83 so as to program it to operate in the same way as the first manipulator. This movement of program portions objects 87 is reflected in a change in the control program 42 or 49 where such portions ultimately reside in the control system 10.

Once the program portion object 87 is revealed in its container object 64 (by resetting the visibility flag 88 of the container object), the node editor 78 provides for animation of the instructions of the program portion object 87 as it is executed.

Generally, the program portion object 87 will be a predefined program portion 48 or 49 however when no portion of the program 42 has been expressly allocated to a node, the program portion object 87 may be generated by the node editor 78 which selects instructions for the program portion object 87 that are relevant to the object 64 of its parent node.

In a similar manner, the status object 89 accepts as its argument properties of the device of its parent node.

Referring again to FIG. 6, at decision block 108, if the object selected is a spatially indifferent object 67, then after properties are connected per process block 106, the tool method is run, for example, to display a meter output. Otherwise, at process block 112, the hierarchy of scene graph 56 is changed so that the new spatially linked object 64 is inserted into the object 64 on which it is placed, the latter which serves as a container.

Per conventional scene graph manipulation, nodes representing objects may be copied, cut and pasted thereby duplicating the objects 64 in this manner. As represented in FIG. 5, the cursor 76 may be used to select a program portion object 87 used, for example, in one manipulator, copy it, and move it to a second manipulator so as to program that second manipulator to operate in the same manner.

As well as providing for organizational structure for the complexity of a control system, the objects 64 may be monitored through the present system to provide for a review or troubleshooting of the industrial control system 10. Animation of the machine objects 64 are such as to represent their actual movement in the factory, however, non-moving objects such as the communications network 26 may also be animated, for example, through the use of moving arrowheads 114 indicating data flow. Non programmed objects 64" such as manufactured product, may also be animated based on input output signals indicating their presence as sensed by other objects 64 within the factory.

Thus, the present invention provides a highly intuitive method of organizing a large amount of data associated with an industrial control process including data about the hardware, the operating environment and the particular application programs as well as the states of each.

Many other modifications and variations of the preferred embodiment which will still be within the spirit and scope of the invention will be apparent to those with ordinary skill in the art. In order to apprise the public of the various embodiments that may fall within the scope of the invention, the following claims are made:

I claim:

1. A human/machine interface for use with an industrial control system including at least one electronic computer controlling the operation of an industrial process through the use of a control program receiving control data from the industrial process in the form of control inputs and providing control data to the industrial process in the form of control outputs, the industrial process including a plurality of machines operating in a factory, the industrial control system communicating with the machines over a network, the interface comprising:

(a) a visual display;
(b) a multidimensional input device;
(c) a computer communicating with the network and the visual display and multi-dimensional input device, wherein and executing an interface program:
 (i) provides a three dimensional virtual representation of the factory;
 (ii) provides images of the machines dispersed in three-dimensions within the virtual factory and images of control data associated with control of a given machine linked to the image of the given machines;
 (iii) in response to the multi-dimensional input device, changes the viewpoint allowing a user viewing the display and operating the multidimensional input device to obtain the perception of moving through the virtual factory;and
 (iv) represents relationships between portions of the control program and images of associated machines by placing the images of the control program visually within the images of the machines.

2. The human/machine interface of claim 1 wherein the computer further executes the interface program to animate the images in response to the control data.

3. The human/machine interface of claim 2 wherein the type of animation is selected from the group consisting of: a depiction of a changing state of operation of a machine, a depiction of changing values of data used by a machine, a depiction of a point of execution a portion of the control program related to a machine, and a flow of data between machines.

4. The human/machine interface of claim 1 wherein the interface program executed on the computer responds to input from the multidimensional input device to allow the user to select images of machines having components and wherein the images of the machines are initially opaque and the computer responds to a first selection of the image of a machine to cause it to open to reveal images of components.

5. The human/machine interface of claim 1 wherein the interface program executed on the computer responds to input from the multidimensional input device to allow the user to select images and wherein a selected image may be moved by further input from the multidimensional input device to change the proximity of the images.

6. The human/machine interface of claim 1 wherein the interface program executed on the computer further provides images of objects representing tools that operate on the control program and data wherein the interface program executed on the computer responds to input from the multidimensional input device to allow the user to link the images of the objects to an image of an argument of data or a portion of the control program.

7. The human/machine interface of claim 1 wherein the interface program executed on the computer responds to input from the multidimensional input device to allow the user to select images of program portions and wherein a selected image of program portions may be duplicated and linked to images of a machine.

8. The human/machine interface of claim 1 wherein the visual display is selected from the group consisting of: a free standing display and a head mounted display and wherein the multidimensional input device is selected from the group consisting of: a keyboard, a mouse, a spaceball, an electronic tablet, a data glove, a microphone, an eye gaze tracker and a head position tracker.

9. A human/machine interface for use with an industrial control system including at least one electronic computer controlling the operation of an industrial process through the use of a stored program receiving control data from the industrial process in the form of control inputs and providing control data to the industrial process in the form of control outputs, the industrial process including a plurality of machines operating in a factory, the industrial control system communicating with the machines over a network, the interface comprising:

(a) a visual display;

(b) a multidimensional input device;

(c) a computer communicating with the network and the visual display and multi-dimensional input device, wherein an interface program:

(i) provides a three dimensional virtual representation of the factory;

(ii) provides images of the machines dispersed in three-dimensions within the virtual factory and images of control data associated with control of a given machine linked to the image of the given machines; and (iii) in response to the multi-dimensional input device, changes the viewpoint allowing a user viewing the display and operating the multidimensional input device to obtain the perception of moving through the virtual factory; and wherein the interface program executed on the computer represents relationships between a first and second machine by placing the images of the machines in proximity and wherein images of machines are associated with programs accepting arguments and wherein the placing of the images of the first and second machine in proximity connects control data associated with the first machine to arguments associated with the second machine.

10. A human/machine interface for use with an industrial control system including at least one electronic computer controlling the operation of an industrial process through the use of a stored program receiving control data from the industrial process in the form of control inputs and providing control data to the industrial process in the form of control outputs, the industrial process including a plurality of machines operating in a factory, the industrial control system communicating with the machines over a network, the interface comprising:

(a) a visual display;

(b) a multidimensional input device;

(c) a computer communicating with the network and the visual display and multi-dimensional input device, wherein an interface program:

(i) provides a three dimensional virtual representation of the factory;

(ii) provides images of the machines dispersed in three-dimensions within the virtual factory and images of control data associated with control of a given machine linked to the image of the given machines; and (iii) in response to the multi-dimensional input device, changes the viewpoint allowing a user viewing the display and operating the multidimensional input device to obtain the perception of moving through the virtual factory; and wherein the interface program executed on the computer further provides images of objects that move with the user when the user moves through the virtual factory and that represent tools that operate on the control program, and data wherein the interface program executed on the computer responds to input from the multidimensional input device to allow the user to link the images of the objects to an image of an argument of data or a portion of the control program.

* * * * *